(12) United States Patent
Heiniger et al.

(10) Patent No.: US 12,717,211 B2
(45) Date of Patent: Aug. 25, 2026

(54) FREQUENCY CONVERSION OF A WAVELENGTH DIVISION MULTIPLEXED LIGHT SOURCE

(71) Applicant: TOPTICA Photonics Inc., Pittsford, NY (US)

(72) Inventors: Adam Taylor Heiniger, Rochester, NY (US); Matthew James Cich, Roseville, MN (US)

(73) Assignee: TOPTICA Photonics Inc., Pittsford, NY (US)

( * ) Notice: Subject to any disclaimer, the term of this patent is extended or adjusted under 35 U.S.C. 154(b) by 211 days.

(21) Appl. No.: 18/417,538

(22) Filed: Jan. 19, 2024

(65) Prior Publication Data

US 2024/0160082 A1 May 16, 2024

Related U.S. Application Data

(63) Continuation of application No. 17/461,406, filed on Aug. 30, 2021, now abandoned.

(51) Int. Cl.
*G02F 1/39* (2006.01)
*G02F 1/35* (2006.01)
(Continued)

(52) U.S. Cl.
CPC ................ *G02F 1/39* (2013.01); *G02F 1/353* (2013.01); *H04B 10/503* (2013.01); *H04J 14/02* (2013.01); *H04J 14/0227* (2013.01)

(58) Field of Classification Search
CPC ......... G02F 1/39; G02F 1/353; H04B 10/503; H04B 10/112; H04B 10/506;
(Continued)

(56) References Cited

U.S. PATENT DOCUMENTS 8,953,647 B1 * 2/2015 Mead .................... H01S 3/1616 372/6
2019/0086765 A1 * 3/2019 Mueller ................ G02F 1/3532
(Continued)

*Primary Examiner* — Hibret A Woldekidan
(74) *Attorney, Agent, or Firm* — Adams & Reese LLP; John Henry Scott, III

(57) ABSTRACT

A method for generating frequency converted laser radiation is disclosed. The disclosure provides a method enabling generation of a frequency converted wavelength division multiplexed light source that is easy to implement at low cost. Adjustment of the center frequency and the mode spacing in a frequency converted wavelength division multiplexed light source is also disclosed. A related method of use discloses generating pump laser radiation through combination of multiple pump sources in a wavelength division multiplexed arrangement; passing the pump laser radiation through the non-linear medium of a singly resonant, single-frequency optical parametric oscillator, wherein the pump laser radiation is continuous wave or pulsed, wherein the pulse duration in the latter case is longer than the time the optical parametric oscillation requires to reach its steady state; and coupling out the non-resonant idler or signal laser radiation from the optical parametric oscillator as usable frequency converted laser radiation. Moreover, the invention relates to a laser device for carrying out the method of the invention.

19 Claims, 1 Drawing Sheet

(51) Int. Cl.
*H04B 10/50* (2013.01)
*H04J 14/02* (2006.01)

(58) Field of Classification Search
CPC ..... H04B 10/504; H04B 10/505; H04J 14/02; H04J 14/0227; H04J 14/05
See application file for complete search history.

(56) References Cited

U.S. PATENT DOCUMENTS

2019/0089121 A1* 3/2019 Mueller .................... G02F 1/39
2020/0285131 A1* 9/2020 Marandi .................. G02F 1/39

* cited by examiner 11
12
13
14
15

11
21
22
23
24
25
13
14
15

FREQUENCY CONVERSION OF A WAVELENGTH DIVISION MULTIPLEXED LIGHT SOURCE

CROSS-REFERENCES TO RELATED APPLICATIONS

This patent application claims benefit of U.S. patent application Ser. No. 17/461,406, filed Aug. 30, 2021, the contents of which are hereby incorporated by reference in their entirety.

FIELD

The present invention relates to methods and devices for generating a frequency converted wavelength division multiplexed light source.

BACKGROUND

There is a need for free-space optical communications systems with information transmission rates matching those of fiber optic systems. Free-space optical systems allow for faster and more secure data transmission than commonly used radiofrequency (RF) signals. However, most light sources used for optical fiber telecommunications operate at a wavelength band optimized for transmission in optical fiber and not for free-space communication. This invention relates to a method and device that can convert multiplexed communications channels from the telecom band to the mid-infrared (MIR).

Modern internet speeds are made possible by networks of optical fibers. In optical communication systems, information is encoded onto otherwise continuous-wave laser light by modulation of the amplitude or phase of the laser light. A single optical communication signal can transmit information at a rate of more than 10 gigabytes per second (Gbps). An optical fiber can carry many independent signals, provided that the optical spectrum of each signal does not overlap. This technique, called wavelength division multiplexing (WDM), can increase the capacity of a single optical fiber to much more than 1 terabyte per second. Individual information channels each transmitting 10 Gbps are spectrally spaced at an optical frequency distance of at minimum 12.5 GHz without significant crosstalk between channels. 12.5 GHz corresponds to 0.100 nm at a wavelength of 1550 nm (see G. P. Agarawal, *Fiber-Optic Communication Systems,* 4th Ed., Wiley, 2010, pp. 223-230).

Fiber optic communication systems have led to drastic changes in the way humans conduct work and pursue entertainment, but they are not suitable for all information delivery needs. For example, there is little economic advantage to installing fiber optic systems in remote or rural areas of the world with low population density. In these cases, free-space communication systems can be used to transit information through the air, either from the ground to a satellite link, or between two terrestrial links. Several private enterprises have plans to launch constellations of thousands of satellites in the 2020s and 2030s to offer the internet anywhere in the world.

Currently, most communication between ground and satellite links is done in the RF, which does not readily permit the Tbps rates of optical communications. Optical communication signals in fiber have wavelengths between 1260-1620 nm, because this wavelength range corresponds to a transmission maximum in fused silica optical fiber. In Earth's atmosphere, optical transmission is optimal in high transmission "windows" where absorption due to water and other atmospheric species is minimal. This includes MIR spectral bands between 3-5 μm and 8-12 μm. Thus, the optimal free-space communications system would use light in these wavelength bands.

WDM light sources for telecommunications typically are composed of multiple distributed feedback (DFB) diode lasers with wavelengths between 1260-1620 nm. Each laser is continuous-wave, they have center frequencies spectrally separated by the WDM channel spacing, and they have spectral width that is much narrower than the channel spacing. Each laser can be modulated in amplitude or phase in order to encode information on that wavelength channel. For long distance information transfer, rare earth element-doped optical fiber amplifiers can be used to boost WDM system output power. Massive development in telecommunications components over the last few decades has greatly reduced the price of DFB diode lasers and optical amplifiers in the telecommunications band.

Lasers that directly emit in the MIR are multiple orders of magnitude more expensive than in the telecom, and they do not have the Watt-level powers needed for long distance propagation in the atmosphere. Also, optical devices used to encode information are not readily available in the MIR. Non-linear optical frequency conversion is used to generate light in "difficult" optical frequency ranges like the MIR, and when done correctly, information encoded on NIR light is transferred to the MIR light. Difference frequency generation between a 1083 nm ytterbium fiber laser and a 1550 nm communications signal generated a few milliwatts of information-carrying signal near 3600 nm (see Wei Wang, et. al., 5 *Ghaud QPSK coherent transmission in the mid-infrared*). It is likely that this could be extended to WDM conversion, but the power levels are insufficient for the application.

Continuous wave optical parametric oscillators (CWOPO) convert high power pump light from the near-infrared (NIR) to the MIR with high conversion efficiency, and thus high power (see David B Foote, et al., *High-resolution, broadly-tunable mid-JR spectroscopy using a continuous wave optical parametric oscillator*). However, it is typically understood that a continuous-wave pump is required for CWOPOs, so that a WDM MIR system would require many expensive CWOPOs, amd expensive MIR modulation components Against this background it is readily appreciated that there is an unmet need for an improved technique for generating a frequency converted high power wavelength division multiplexed optical communication signal.

SUMMARY

An object of the invention is to provide a method and a laser device that enable the generation of a frequency converted WDM source and that are easy to implement at low cost.

In accordance with the invention, a method of generating frequency converted laser radiation is disclosed. In one specific though non-limiting embodiment, the method comprises generating pump laser radiation that is a high power WDM optical communication signal; passing the pump laser radiation through the non-linear medium of a singly resonant, single frequency optical parametric oscillator, wherein the pump laser radiation is continuous wave or quasi-continuous wave such that parametric oscillation is maintained; and coupling out the non-resonant idler or signal laser radiation from the optical parametric oscillator as usable frequency converted laser radiation.

In another example embodiment, a laser device suitable for practicing the invention comprises a pump laser source configured to generate pump laser radiation that is a high power WDM optical communication signal; a singly resonant, single frequency optical parametric oscillator comprising a non-linear medium located in an optical cavity, with the pump laser radiation passing through the non-linear medium, wherein the optical cavity is configured to be resonant at only a single cavity mode, wherein the pump laser radiation is continuous wave or quasi-continuous wave such that parametric oscillation is maintained; and an arrangement of one or more optical components configured to couple out the non-resonant idler or signal laser radiation from the optical parametric oscillator as usable frequency converted laser radiation.

In another example embodiment, a singly resonant, single frequency optical parametric oscillator (meaning that the optical cavity of the optical parametric oscillator is resonant at only a single cavity mode) is used rather than an optical parametric oscillator with a cavity that is resonant at many different cavity modes, the latter being typical in known synchronized arrangements of mode-locked pump laser sources and optical parametric oscillators. Optical parametric oscillation on the basis of an optical cavity that is configured to be resonant at only a single cavity mode requires that the pump laser radiation is continuous wave (including quasi-continuous wave). In a WDM pump source wherein information is encoded on individual channels via amplitude modulation, there may be a time bin or consecutive time bins in which all communication channels carry zero amplitude. If this dark state lasts longer than the ring-down time of the optical parametric oscillator cavity, then frequency conversion will be lost. When a signal returns, it many time bins may pass before oscillation is restored, and some bits will be lost. To prevent this from occurring, one channel can be dedicated to maintaining oscillation when amplitude-based modulation is employed. This dedicated channel will be left always in the "on" state.

If the optical parametric oscillator is resonant at, the frequency of the signal (respectively idler) laser radiation, then the non-resonant idler (respectively signal) laser radiation coupled out from the optical parametric oscillator has a spectrum which is the convolution of the spectrum of the pump laser radiation and the single-line, narrow-linewidth cavity mode spectrum of the singly resonant and single frequency optical parametric oscillator. In other words, the spectrum of the non-resonant output, i.e., the usable frequency converted laser radiation coupled out from the optical parametric oscillator is a frequency converted replica of the spectrum of the pump laser radiation. To achieve this, the resonant linewidth of the singly resonant, single frequency optical parametric oscillator should be (significantly) smaller than the linewidths of the equidistant spectral lines contained in, the pump laser radiation.

In yet another embodiment, the frequency of the usable frequency converted laser radiation is adjusted by changing the phase matching conditions of the non-linear medium; and/or changing the resonant frequency of the singly resonant, single-frequency optical parametric oscillator, e.g., by changing the cavity length; and/or changing the resonant mode of the singly resonant single-frequency optical parametric oscillator; and/or tuning the center frequency of the pump laser radiation.

The spectral extent of the frequency converted laser radiation is limited by the phase matching bandwidth of the non-linear medium. Single-frequency optical parametric oscillators efficiently convert the pump laser radiation, so that the power of the usable frequency converted laser radiation can be expected to be 10-50% of the power of the pump laser radiation.

In practice, the center frequencies of WDM channels contained in the non-resonant output of the optical parametric oscillator will drift if there is drift in the resonant cavity mode, e.g., due to changing environmental conditions. For some applications this drift may be insignificant, but other applications require high stability of the output spectrum. Drift of the frequency converted spectrum can be actively stabilized in accordance with the invention by electronic feedback to the spectrum of the pump laser radiation and/or to the resonant mode of the singly resonant, single-frequency optical parametric oscillator.

In one embodiment of the invention, the pump laser radiation is generated by beam-combining multiple continuous wave sources that can be independently modulated in amplitude or phase. For example, many single-frequency continuous wave distributed feedback (DFB) diode lasers are combined into a single fiber. A rare earth-doped optical fiber amplifier is used to amplify the thus generated WDM source before passing it through the non-linear medium of the optical parametric oscillator. Such amplifiers are relatively inexpensive and available at an output power in the range of 1-1000 W.

Advantageously, a single optical parametric oscillator design can be used with many different WDM channel spacings.

One advantage of the invention is that it enables efficient frequency conversion at low cost and low complexity. The singly resonant, single-frequency optical parametric oscillator itself has low or moderate complexity (depending on whether the application demands that the frequency converted optical frequency comb is compensated for cavity drift). Additionally, the pump laser radiation is generated from standard low-cost telecommunications equipment.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention.

DETAILED DESCRIPTION

Figures 1, 2:
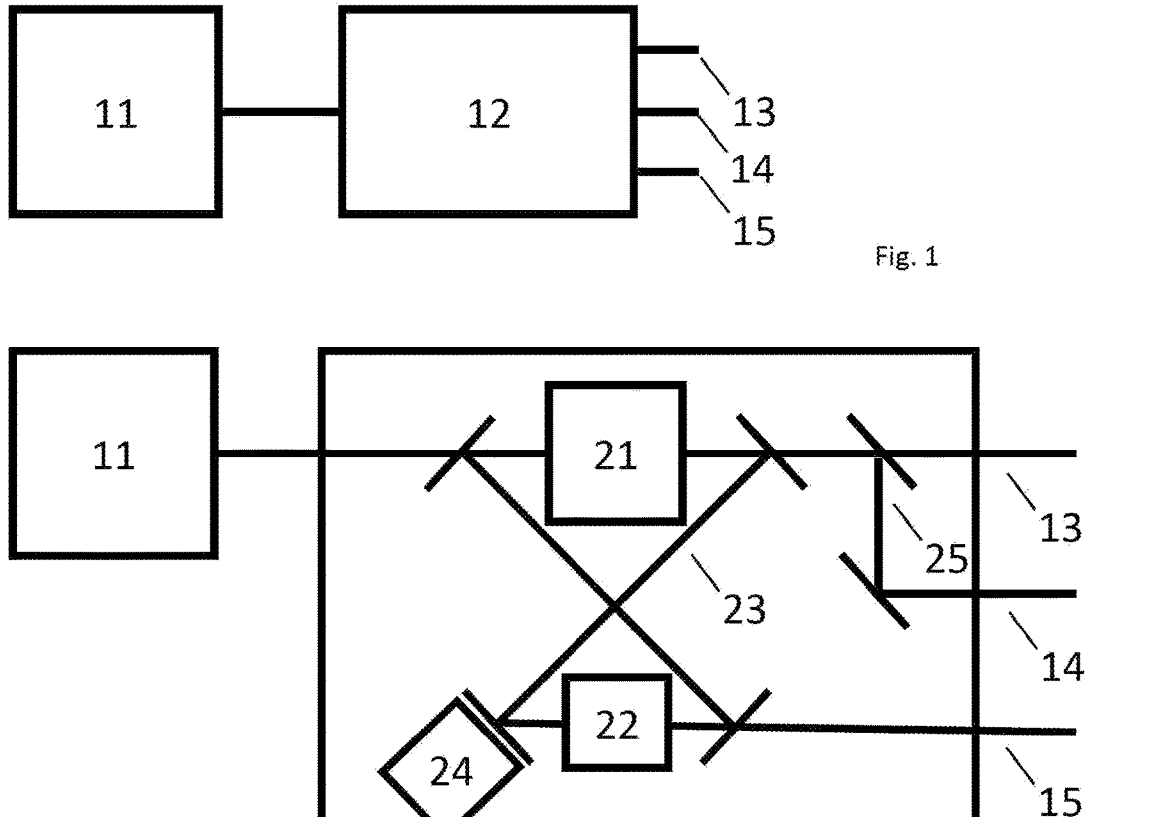
FIG. 1 schematically illustrates an example laser device according to an embodiment of the invention as a block diagram.
FIG. 2 is a more detailed illustration of the example laser device of FIG. 1.

FIG. 1 schematically illustrates a laser device according to an embodiment of the invention. In one embodiment, the laser device comprises a pump laser source 11. In a further embodiment, the spectrum of the pump laser source 11 is a wavelength division multiplexed optical communications source.

In another embodiment, the pump laser radiation is provided to a singly resonant, single-frequency optical parametric oscillator 12. In the depicted embodiment, the optical parametric oscillator 12 has three outputs, namely a residual pump output 13, a resonant output 15 and a non resonant output 14.

In one example embodiment, the non-resonant (idler or signal) laser radiation is coupled out from the optical parametric resonator 12 as usable frequency converted laser radiation via output 14. The (idler or signal) laser radiation at the non-resonant output 14 has a spectrum which is the convolution of the spectrum of the pump laser radiation and the spectrum of the single resonant cavity mode of the optical parametric oscillator 12. In such case the single cavity mode spectrum is generally, though not necessarily, much narrower than the spacing between the spectral lines in the pump spectrum, thus the laser radiation at the non-resonant output 14 also is a wavelength division multiplexed optical communications source.

In the example embodiment of FIG. 2, a non-linear medium 21 (e.g., a periodically poled non-linear crystal) is placed inside a bow-tie cavity 23 that is resonant for either the signal or idler laser radiation. In one embodiment, an etalon 22 is placed in the cavity 23 outside the beam path of the pump laser radiation and the non-resonant (idler respectively signal laser radiation). In another, the cavity 23 is designed to be resonant at only one single cavity mode that matches the spectrum of the signal or idler laser radiation. In a further embodiment, the residual pump laser radiation and the non-resonant output beam paths (for coupling out the usable frequency converted laser radiation) are split using a dichroic filter 25. In other embodiments, the residual pump 13 and resonant output 15 are accessible to the user of the device as well. In a further embodiment, the pump laser radiation is continuous wave or quasi-continuous wave such that parametric oscillation is maintained.

In further embodiments, the wavelength division multiplexed optical communications source contained in the spectrum of the usable laser radiation at the non-resonant output 14 is frequency tuned by adjusting the phase matching conditions in the non-linear medium 21, for example, by heating, rotating, or shifting the medium. In one embodiment, the wavelength division multiplexed optical communication source contained in the radiation at the non-resonant output 14 is also tuned by adjusting the length of the cavity, for example, by using a piezoelectric transducer 24 carrying one of the cavity mirrors and/or by rotating the etalon 22.

In other embodiments, the wavelength division multiplexed optical communication source at the non-resonant output 14 can further be tuned by selecting a different cavity mode for oscillation, for example, by rotating the etalon 22 to such a degree that a cavity mode hop occurs. In further embodiments, the wavelength division multiplexed optical communication source at the output 14 is tuned by wavelength tuning of the pump laser source 11. In still further embodiments, the pump laser source 11 is wavelength tuned and the resonant mode of the cavity 23 does not change, so energy conservation causes the radiation at the non-resonant output 14 to change by the same amount of energy as the pump laser radiation.

Though the present invention has been depicted and described in detail above with respect to several exemplary embodiments, those of ordinary skill in the art will also appreciate that minor changes to the description, and various other modifications, omissions and additions may also be made without departing from either the spirit or scope thereof.

The invention claimed is:

1. A method for generating frequency converted laser radiation, comprising the steps of:
- generating pump laser radiation comprised of a wavelength division multiplexed optical communication source, wherein the wavelength division multiplexed optical communication source comprises multiple independently modulated continuous wave sources, each being an information carrier;
- passing the pump laser radiation through a non-linear medium of a singly resonant, single-frequency optical parametric oscillator, wherein the pump laser radiation comprises a continuous wave or quasi-continuous wave such that parametric oscillation is maintained; and
- coupling out a non-resonant idler or signal laser radiation from the optical parametric oscillator as usable frequency converted laser radiation.

2. The method of claim 1, wherein a spectrum of the usable frequency converted laser radiation coupled out from the optical parametric oscillator comprises a frequency converted replica of a spectrum of the pump laser radiation.

3. The method of claim 1, wherein a resonant linewidth of the singly resonant, single-frequency optical parametric oscillator is smaller than the linewidths of the individual optical communications channels contained in the pump laser radiation.

4. The method of claim 1, wherein the frequency of the usable frequency converted laser radiation is adjusted by:
- changing phase matching conditions of the non-linear medium; and/or
- changing a resonant frequency of the singly resonant, single-frequency optical parametric oscillator, and/or
- changing a resonant mode of the singly resonant, single-frequency optical parametric oscillator, and/or
- tuning a center frequency of the pump laser radiation.

5. The method of claim 1, wherein an optical spectrum of the usable frequency converted laser radiation is actively stabilized by electronic feedback to the spectrum of the pump laser radiation and/or to a resonant mode of the singly resonant, single-frequency optical parametric oscillator.

6. The method of claim 1, wherein the wavelength division multiplexed optical communication source comprises a laser source further comprising a plurality of spectral lines, each of which comprises an information carrier.

7. The method of claim 6, wherein each information carrier is independently modulated in amplitude in order to independently encode information on that carrier.

8. The method of claim 6, wherein a single channel of the wavelength division multiplexed optical communication source is maintained in an "on" state without amplitude modulation, in order to prevent a situation where amplitude modulation leaves all channels with zero power; wherein loss of power to the optical parametric oscillator for sufficient time will halt frequency conversion.

9. A laser device comprising:
- a pump laser source comprised of a wavelength division multiplexed optical communication source, wherein the wavelength division multiplexed optical communication source comprises multiple independently modulated continuous wave sources, each of the wave sources comprising an information carrier;
- a singly resonant, single frequency optical parametric oscillator comprising a non-linear medium located in an optical cavity, with the pump laser radiation passing through the non-linear medium, wherein the optical cavity is configured to be resonant at only a single cavity mode, wherein the pump laser radiation is continuous wave or quasi-continuous wave such that parametric oscillation is maintained; and
- an arrangement of one or more optical components configured to couple out a non-resonant idler or signal laser radiation from the optical parametric oscillator as usable frequency converted laser radiation.

10. The laser device of claim 9, wherein the pulse duration of the pump laser radiation is longer than a multiple of the round-trip time of a resonant signal or idler radiation in the optical cavity.

11. The laser device of claim 9, wherein the optical cavity comprises a bow-tie cavity.

12. The laser device of claim 9, wherein an etalon is located within the optical cavity in the beam path of a resonant signal or idler laser radiation and outside the beam paths of the pump laser radiation and the non-resonant idler or signal laser radiation.

13. The laser device of claim 9, wherein the non-linear medium comprises a periodically poled non-linear crystal.

14. The laser device of claim 9, wherein the wavelength division multiplexed optical communication source comprises a laser source further comprising a plurality of spectral lines, each of which is an information carrier.

15. The laser device of claim 10, wherein each information carrier is independently modulated in amplitude and/or phase in order to independently encode information on that carrier.

16. The laser device of claim 15, wherein a single channel of the wavelength division multiplexed optical communication source is maintained in an "on" state without amplitude modulation, in order to prevent a situation where amplitude modulation leaves all channels with zero power; wherein loss of power to the optical parametric oscillator for sufficient time will halt frequency conversion.

17. A laser device, comprising:

a pump laser source comprised of a wavelength division multiplexed optical communication source, wherein the wavelength division multiplexed optical communication source comprises a laser source including a plurality of approximately equidistant narrow spectral lines, each of which comprises an information carrier;

wherein each information carrier is independently modulated in amplitude and/or phase in order to independently encode information on that carrier;

a singly resonant, single frequency optical parametric oscillator comprising a non-linear medium located in an optical cavity, with the pump laser radiation passing through the non-linear medium, wherein the optical cavity is configured to be resonant at only a single cavity mode, wherein the pump laser radiation is continuous wave or quasi-continuous wave such that parametric oscillation is maintained;

an arrangement of one or more optical components configured to couple out a non-resonant idler or signal laser radiation from the optical parametric oscillator as usable frequency converted laser radiation; and wherein a single channel of the wavelength division multiplexed optical communication source is maintained in an "on" state without amplitude modulation, in order to prevent a situation where amplitude modulation leaves all channels with zero power; and wherein loss of power to the optical parametric oscillator for sufficient time will halt frequency conversion.

18. The laser device of claim 17, wherein the pulse duration of the pump laser radiation is longer than a multiple of the round-trip time of a resonant signal or idler radiation in the optical cavity.

19. The laser device of claim 17, wherein the pulse duration of the pump laser radiation is longer than a multiple of the round-trip time of a resonant signal or idler radiation in the optical cavity.

* * * * *